Figure 1:
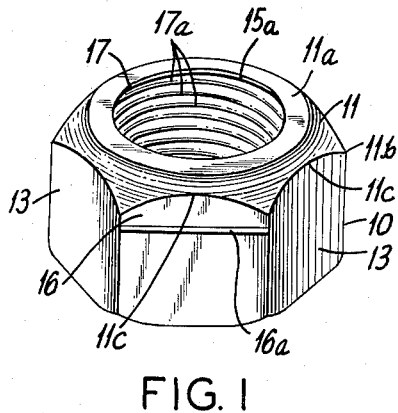

Aug. 3, 1965  J. H. STOVER III  3,198,230
LOCK NUT
Filed June 26, 1964

INVENTOR.
JORDON H. STOVER, III
BY
Davis, Hoxie, Faithfull & Hapgood
ATTORNEYS.

United States Patent Office 3,198,230
Patented Aug. 3, 1965

3,198,230
LOCK NUT
Jordan H. Stover III, Bloomfield Hills, Mich., assignor to The Lamson and Sessions Company, Cleveland, Ohio, a corporation of Ohio
Filed June 26, 1964, Ser. No. 378,354
2 Claims. (Cl. 151—21)

The present application is a continuation-in-part of my copending application Serial No. 96,216, filed March 16, 1961, which is now abandoned.

This invention relates to prevailing torque-type lock nuts made by compressing a nut on two opposite sides at the top of the nut.

Lock nuts of the type described have been used extensively and have advantages for many different applications, an example of such a nut being disclosed in U.S. Patent No. 2,464,729, dated March 15, 1949. However, such lock nuts as made heretofore have had several disadvantages, as follows:

(1) They assembly poorly on the bolts. That is, when a minimum tapped nut made to commercial dimensions and tolerances is compressed at the top sufficiently to produce prevailing torque on a minimum threaded bolt made to commercial tolerances, the nut tends to distort over its entire length in standard nut heights. Thus, it cannot be mated with a maximum external thread gauge and causes extreme difficulty with thread start on maximum threaded bolts made to commercial tolerances, and increases cross threading tendencies.

(2) They fit poorly in socket-wrenches. When a commercial tolerance hexagonal nut having a maximum width across flats is compressed as described above, the two unrestrained corners tend to protrude, and the nut cannot be fitted to a standard minimum socket.

(3) They cannot be readily hopper-fed in automated assemblies. Insufficient difference between top and bottom prevents rapid and inexpensive hopper feeding so that each nut can automatically be put on the bolt right side up.

(4) They tend to freeze or gall on the bolts. When a minimum tapped nut is compressed as described above, it tends to freeze or gall and produces excessively high prevailing torques, particularly when screwed on a maximum size commercial thread bolt with a power wrench.

(5) They produce extremely wide variations in clamp force when tightened against the work on bolts at a given torque. When a minimum tapped nut is compressed as described above, it tends to give extremely low clamp force; and if it galls, the clamp force may be zero. Low clamp forces tend to fatigue or break or damage bolts when subjected to continuous vibration and shock. On the other hand, a maximum tapped nut when so compressed tends to create substantially higher clamp force when tightened on the bolt to a given torque. These extremely high clamp forces may yield or break or strip the bolt.

(6) They produce too stiff a locking spring. In a lock nut made as described, the entire wall of the nut is used as a spring to provide pressure on two opposite sides of the bolt so that a suitable lock, or prevailing torque, will result on both a maximum pitch diameter bolt and a minimum pitch diameter bolt. If this spring is too stiff, or the spring rate too low, an extremely wide prevailing torque scatter band will result from one nut and bolt combination to another. A maximum pitch diameter bolt when mated with a minimum pitch diameter tapped nut will give an extremely high prevailing torque and may even gall, while a minimum pitch diameter bolt when mated with a maximum pitch diameter tapped nut will give an extremely low prevailing torque.

(7) The locking action of the nut may be lost when the nut is tightened sufficiently to develop 75 percent of the proof load of the bolts. If the amount of locking compression and, in turn, the prevailing torque of a maximum tolerance tapped nut is low, the tapped threads in the nut will tend to be straightened out by the clamp forces which act at right angles to the axis of the bolt through the 60° angles on the flanks of the thread when the nut is mated with a minimum tolerance threaded bolt and tightened to produce a clamp force on the bolt equal to 75% of proof loads. A lock nut in which the spring is too stiff should be made with low compression and low prevailing torque in order to prevent galling when a minimum tapped nut is mated with a maximum threaded bolt. This also results in the thread bearing area of the locking section in the nut being a minimum. Because of this minimum bearing area, problems will result because wear is concentrated on the minimum locking contact area. For example, when the maximum tolerance tapped nut is run onto a minimum tolerance threaded bolt with a high speed power wrench, the friction is concentrated onto a small bearing area, and may cause complete loss of locking action because of the frictional wear, particularly when two or more nut heights of the bolt protrude through the nut.

The principal object of the present invention is to provide a lock nut of the type described which overcomes the above-noted disadvantages.

I have discovered that these disadvantages can be largely or entirely overcome by precisely compressing, across two opposite sides, a specially constructed nut blank manufactured to special tolerances and by treating with a special lubricant the lock nut thus formed. The resulting lock nut of my invention provides a consistent variable-rate spring locking action which produces consistent prevailing torque on bolts of both maximum and minimum pitch diameter and on bolts where the threads deviate in other ways from a perfect thread, such as in lead and profile. The new nut also produces more consistent clamp loads on bolts at a given torque when tightened to more than 50 percent of the proof load of the bolt, as compared with standard nuts and the nut of the aforesaid patent. It also produces the same clamp load at a lower torque. It can be easily fitted in standard wrenches, easily started on bolts, and will not freeze or gall when tightened or run down with conventional power wrenches. It maintains its locking action over five removals, is readily adapted to automatic feeding, and will develop more tightening strength in its mating bolt.

Figure 2:
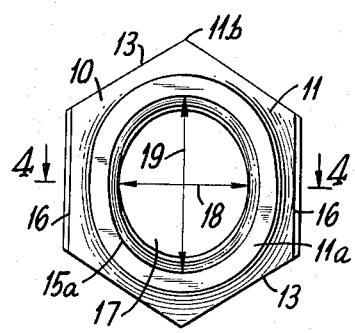
Figure 4:
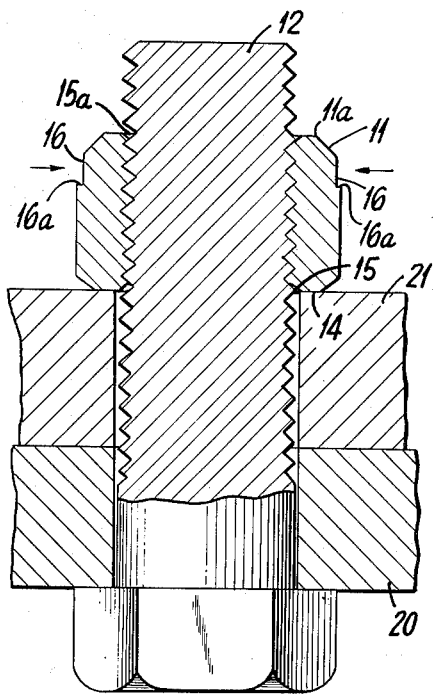
Figure 3:
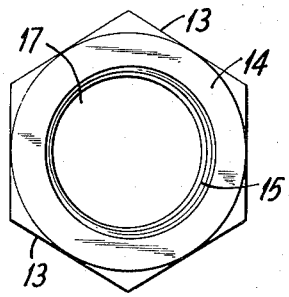

The invention will be described more particularly in the following detailed description in conjunction with the accompanying drawing, in which:

FIG. 1 is a perspective view of a lock nut made according to the invention; FIGS. 2 and 3 are views of the top and bottom, respectively, of the nut shown in FIG. 1; and FIG. 4 is a vertical sectional view of an assembly including the nut, its mating bolt, and two parts held together by the nut and bolt, the nut section being on the line 4—4 in FIG. 2.

The nut as illustrated is made from a nut blank 10 formed at the top with a truncated cone 11 tapering upwardly from the main hexagonal body of the blank. Before distortion of the nut blank as hereinafter described, the external diameter of the truncated cone 11 at its smaller or upper end is 1.20D minimum to 0.015 inch plus 1.20D maximum, where D is the nominal diamater of the mating bolt 12 in inches (FIG. 4). The angle between the bolt axis and the tapering side wall of the cone is about 45°, preferably 45° plus/minus 2°.

The width across opposing flats of the hexagonal portion of the nut blank is controlled. For example, for nuts ⅜", ½", ⅝", the width across flats will be according to the formula 1.485D plus 0.006 to 0.012 inch and for nuts having diameters of ¾", ⅞", 1", etc., the width across flats will be according to the formula 1.450D to 1.450D plus 0.018 inch. In all cases D is the nominal diameter of the mating bolt in inches. The specified width across flats is in the lower half of the tolerance range for finished hexagon nuts specified by "American Standard Square and Hexagon Nuts and Bolts" (A.S.A.B. 18.2, 1960). The standard width is specified on page 17 of this publication published by The American Society of Mechanical Engineers, New York, New York, and the widths for the typical nut blanks of the present invention are tabulated below, the dimensions being in inches and based on the lower half of the aforesaid tolerance range.

| Nominal Size or Basic Major Diameter of Thread | Standrad Width Across Flats | Present Width Across Flats |
| --- | --- | --- |
| ¼ | .428 to .4375 | .428 to .4328 |
| 5/16 | .489 to .500 | .489 to .4945 |
| ⅜ | .551 to .5625 | .551 to .5567 |
| 7/16 | .675 to .6875 | .675 to .6812 |
| ½ | .736 to .7500 | .736 to .743 |
| 9/16 | .861 to .8750 | .861 to .868 |
| ⅝ | .922 to .9375 | .922 to .9297 |
| ¾ | 1.088 to 1.125 | 1.088 to 1.1065 |
| ⅞ | 1.269 to 1.3125 | 1.269 to 1.291 |
| 1 | 1.450 to 1.50 | 1.45 to 1.475 |
| 1⅛ | 1.631 to 1.6875 | 1.631 to 1.659 |
| 1¼ | 1.812 to 1.875 | 1.812 to 1.843 |
| 1⅜ | 1.994 to 2.0625 | 1.994 to 2.028 |
| 1½ | 2.175 to 2.250 | 2.175 to 2.212 |

Thus, for the present new lock nut the width across flats of the nut blank, as indicated by the right-hand column above, is hereinafter referred to as being within the lower half of the range of widths across flats for standard finished hexagon nuts. This confinement of the width to the lower half of the range is necessary because otherwise a standard socket wrench will not receive the upper portion of the nut after the blank has been distorted by the large amount to be described presently.

The corners of the nut blank 10 may be chamfered or otherwise formed to provide at the bottom of the blank a washer face or bearing face 14 of annular shape surrounding the threaded hole through the nut. The larger diameter of this washer or bearing face 14 is not greater than the maximum and preferably not less than the minimum standard width across flats of a finished hexagon nut as shown in the above table. The bearing face 14 is flat and smooth and is within one degree of being normal to the axis of the threaded hole.

The thickness or overall height of the nut blank 10 is preferably 0.90D maximum to 0.90D−0.015 inch minimum for nut sizes from ¼" through ⅝" nominal thread diameter, and is 0.88D maximum to 0.88D−0.020 inch minimum for nut sizes from ¾" through 1½" nominal thread diameter, although the height may be greater if desired.

The end of the threaded hole adjacent the bearing face 14 of the nut blank and the upper end of the hole may be countersunk to a diameter which is at least the major diameter of the nut thread and no more than this major diameter plus 1/32 inch, as shown at 15 and 15a, each countersink forming a cone frustum with its surface at an angle of 45° to the axis of the threaded hole. At the lower or bearing face of the nut the wider end of the frustum is, of course, at the bottom to facilitate application of the nut to the mating bolt.

The threads in the special nut blank are tapped to such a minimum pitch diameter that the bearing end of the nut will accept at least one full turn of a maximum threaded mandrel as specified in Table VI of "Specifications for Hexagon Locknuts Prevailing-Torque Type Steel" published May 28, 1958, by Industrial Fasteners Institute, after the blank has been compressed across opposing flats as described hereinafter. The maximum pitch diameter of the threads is such that they will support without failure an axial load as specified in Table IV for lock nuts, in the last-mentioned publication, after such compression across the flats.

In accordance with my invention, for nuts in the fine-thread series (U.N.F.) as defined in "Unified Screw Threads," ASA B1.1, published in 1960 by The American Society of Mechanical Engineers, the formula for the pitch diameter (in inches) of the threads in the central hole through nut blank 10 is as follows:

Min. $P \cdot D = M + K/hn$; where M is the minimum pitch diameter of the U.N.F. thread as shown in Table 2.1 of the above-noted ASME publication for Class 3B nuts; K is 0.0000521; and $hn$ is the depth of thread engagement as shown in column 11 of Table 13 on page 62 of the latter publication. Max. $P \cdot D =$ Min. $P \cdot D + T$; where T is the tolerance for the pitch diameter of the U.N.F. thread as shown in said Table 2.1 for Class 3B nuts. Thus, for a ¼–28 nut, for example:

$$\text{Min. } P \cdot D = .2268 + .0000521/.01933$$
$$= .2268 + .0027$$
$$= .2295''$$
$$\text{Max. } P \cdot D = .2295 + .0032$$
$$= .2327''$$

For nuts in the coarse-thread series (U.N.C.) as defined in this ASME publication, the formula for the pitch diameter (in inches) of the threads is the same as above except, of course, that the minimum pitch diameter (M) is that of the U.N.C. thread, the tolerance (T) is that for the pitch diameter of the U.N.C. thread and K is .0000812. Thus, for a ¼–20 nut, for example:

$$\text{Min. } P \cdot D = .2175 + .0000812/.02706$$
$$= .2175 + .0030$$
$$= .2205''$$
$$\text{Max. } P \cdot D = .2205 + .0036$$
$$= .2241''$$

It will be understood that, except as described above, the form and threading of the nut blank 10 may conform to standard practice as disclosed in said ASME publication.

The special nut blank 10 is compressed precisely across a pair of opposing flats to give it a permanent distortion, but this compression is effected only at the upper portion of the nut so that its threaded hole assumes an oval or elliptical shape at the top and remains essentially round at the bottom. More particularly, the compression is effected by squeezing the nut across the upper portions of the two opposing flats so as to form each of them over its squeezed area with an indentation 16 extending continuously across its upper portion and from the top of the flat down to a line of indentation which in the illustrated locknut is horizontal shoulder 16a. The indentation 16 extends down from the plane of the top 11a of the nut a distance equal approximately to one-third of the overall height of the nut. Thus, this vertical spacing of the lowest extent of the indentation 16 from the top of the nut is at least 0.30D−0.005 inch for nut sizes from ¼" through ⅝" nominal thread diameter and is at least [0.88D/3]−[0.020/3] inch for nut sizes from ¾" through 1½" nominal thread diameter. The amount of this compression is also precise, as will be described presently, and is such as to give the nut a prevailing torque which does not exceed that prescribed in Table V of said publication of Industrial Fasteners Institute and which is not less than the breakaway torque "1st Removal" for lock nuts, as prescribed in said last table, after loading the nut to 75% of the proof load of the mating bolt.

After the nut has been compressed across opposing flats, as shown at 16 and described more fully hereinafter, it is given a phosphate black coating or a cadmium plated finish or a zinc coating, although the latter is less preferable. This coating or finish provides adhesion of the subsequent coating of extreme pressure lubricant, especially to the threaded wall of hole 17 and to the washer or bearing face 14 at the undistorted bottom of the nut. The "E.P." lubricant is preferably wax applied by dipping the nut into a wax lubricating solution, such as follows, and then warm air-drying it:

5% hydrogenated castor oil wax
5% paraffin
3% stearic acid
3% lanolin
1% sodium nitrite
3% emulsifier
80% water These coatings make the nut dry to the touch and provide it with a uniform extreme pressure lubricant. The "E.P." lubricant, in combination with the special shape and dimensioning of the nut, produces more uniform prevailing torque characteristics and more uniform clamp load characteristics at a given torque, as compared with prior nuts of this type.

As previously mentioned, the threaded central hole 17 in the nut is generally elliptical at its upper end, having a minor axis 18 and a major axis 19. This elliptical shape is the result of compressing or squeezing the pair of opposed flats toward one another at their upper portions 16—16, over the depth previously stated, beyond the elastic limit of the nut blank to provide a permanent distortion of the blank with the sides of the opening on minor axis 18 pushed toward one another and with the sides of the opening on major axis 19 pushed away from one another. The extent of this permanent distortion, which determines the width along the minor axis 18 at the top of the hole, is such as to provide the nut with a friction locking torque of $115D^{2.4}$ to $820D^{2.5}$ on its mating screw within the dimensional tolerances of its class of fit, in which D equals the nominal diameter of the mating screw and the result is pound-inches of torque. This value may be readily determined by screwing the lock nut on a mating screw, such as a bolt, with a conventional torque wrench. In accordance with the preferred practice, the width of the top of the opening along the minor axis 18 to produce the specified locking torque will be the width at the bottom of the opening reduced by .017 to .030 inch for nut sizes of ¼" through ⅝" nominal diameter and reduced by .025 to .040 inch for nut sizes of ¾" through 1½" nominal diameter. The width of the top of the opening along minor axis 18 is measured from crest to crest of the first or uppermost full thread in the hole; and the width at the bottom of the opening is determined by measuring across a diameter from crest to crest of the last or lowermost full thread in the hole. These measurements may be made with a vernier caliper or a tapered plug gauge.

FIG. 4 illustrates the use of the lock nut when screwed tightly onto a bolt 12 to secure the pieces of work 20 and 21. When the nut is applied to the bolt, it may be screwed on part way freely by hand since the lower part of the nut is essentially undistorted. As the nut is screwed further onto the bolt, the distorted upper portion of the nut tends to assume its original undistorted form due to the resiliency of the wall of the nut. The bolt threads force the compressed sides of the nut against the spring action of the distorted upper portion of the nut. As indicated in the drawing, the threads along the inwardly distorted sides on minor axis 18 of the nut tightly engage their mating threads on the bolt. This spring action causes the nut to grip opposite sides of the bolt and by reason of the amount of the distortion to make a strong friction pressure contact on the top flanks as well as on the bottom flanks of the bolt threads. Accordingly, the nut not only grips the bolt tightly but creates an additional friction area on the threads by pressing against the upper sides as well as the lower sides of the bolt threads, even when the nut is tightened against the work.

A type of apparatus suitable for compressing lock nuts in accordance with the present invention is shown in U.S. Patent No. 2,464,729, dated March 15, 1949. The apparatus shown in that patent comprises mechanism for pressing a nut blank between a pair of opposed squeezing rollers which contact the pair of opposing flats only along their upper portion to form compressin indents 16—16.

It will be apparent that as a result of the permanent distortion caused by the previously described compression across opposing flats, as shown at 16—16, the truncated cone has an elliptical shape. The upper or reduced end 11a of the truncated cone 11 is in the shape of an ellipse having a width which, as measured along the minor axis 18 between the opposite external edges, approximately equals (1.20D to 1.20D+0.015 inch) minus .017 to .030 inch for nut sizes of ¾" through 1½" nominal diameter, and (1.20D to 1.20D+0.015 inch) minus .025 to .040 inch for nut sizes of ¾" through 1½" nominal diameter. At the base of cone 11, the conical surface terminates at the vertical flats 13, including the indented portions 16 of the opposing compressed flats. The base of the cone 11 will have a dimension which, as measured across the indented or deformed portions 16—16 in a plane through the base of the cone at the nut corners, is equal to the width across flats at the bottom of the nut minus about .020 to .032. In other words, although the amount of the permanent distortion at the indentations 16—16 is substantially the same for the different nut sizes, it creates at the top of cone 11 a distortion which increases substantially in amount as the nut size increases.

Referring to the new nut in its illustrated embodiment, it will be observed that the annular elliptical surface 11a forming the top of the nut lies in a plane normal to the nut axis and is of substantially uniform width dimension as measured between the inner and outer edges of the annular surface. The maximum height of the cone 11 is the vertical distance from the plane of its reduced end 11a to the upper ends of the corner formed by the flats, as shown at 11b. It will also be observed that the minimum height of the cone 11, as measured from the highest points 11c of the flats to the plane of the top 11a, is at least one-third of the vertical spacing of shoulders 16 from the top 11a of the nut. In fact, this ratio is approximately one-third for the smallest size nuts (¼") and increases with the nut size. However, the height of the cone is determined essentially by factors previously described, particularly its approximately 45° taper, its external width at the top, and the fact that its conical surface extends downward to the vertical flats having a predetermined spacing between the flats of an opposing pair.

The new nut provides very substantial and unexpectedly improved results as compared to the prior lock nut disclosed in my Patent No. 2,464,729 granted March 15, 1949. This was demonstrated by tests with two randomly selected nuts from each of three groups, as follows:

(A) Nuts made according to said Patent No. 2,464,729.
(B) Nuts made according to the present application.
(C) Standard nuts.

The above three groups are hereinafter designated, respectively, as "Old S" (Group A), "New S" (Group B) and "Std. S" (Group C). The "Old S" and "Std. S" nuts were plated with zinc, the most widely used commercial finish for nuts.

The tests were made by applying each of the "Old S" and "New S" nuts to a test screw (minimum) and measuring the prevailing torque with a torque wrench, the results being shown in the table below in the column entitled "Prevailing Torque—Min. Test Screw (In. Lbs.)." Each of these nuts was then applied to a randomly selected standard mating bolt, and the prevailing torque in each case was similarly measured, the values appearing in the table below in the column entitled "Prevailing Torque—Bolt (In. Lbs.)." Each nut was then tightened on its mating bolt and against a work piece represented by a plate acting on a hydraulic system having a pressure gauge for measuring the clamping force exerted on the plate by the nut. The nut was first tightened against the plate sufficiently to develop a torque of 20 foot pounds as measured by the torque wrench, and the "Clamp Force (Lbs.)" corresponding to this "Tightening Torque (Ft. Lbs.)" was determined from the hydraulic pressure gauge, the results being shown in the corresponding columns of the table. The nut was then further tightened against the plate until the yield point of the threads occurred, as indicated when the pressure gauge began to show a drop in clamping force with continued turning of the nut in the tightening direction. At this yield point, the torque reading on the wrench and the clamp force reading of the pressure gauge were noted, the values appearing in the following table in the columns entitled "Yield Torque (Ft. Lbs.)" and "Yield Clamp Force (Lbs.)," respectively. As the prevailing torque values are significant only with respect to the lock nuts, they were not measured for the standard nuts.

| Nut | Prevailing Torque— Min. Test Screw (In. Lbs.) | Prevailing Torque— Bolt (In. Lbs.) | Tightening Torque (Ft. Lbs.) | Clamp Force (Lbs.) | Yield Torque (Ft. Lbs.) | Yield Clamp Force (Lbs.) |
|---|---|---|---|---|---|---|
| Old $S^1$ | 5 | 35 | 20 | 2,600 | 50 | 5,500 |
| Old $S^2$ | 15 | 35 | 20 | 2,350 | 50 | 5,400 |
| New $S^1$ | 15 | 30-35 | 20 | 4,500 | 35 | 6,800 |
| New $S^2$ | 20 | 60-65 | 20 | 4,900 | 35 | 6,600-6,700 |
| Std. $S_1$ | | | 20 | 1,700 | 55 | 3,600 |
| Std. $S_2$ | | | 20 | 2,000 | 50 | 3,800 |

As will be noted from the above table, while the "Old S" lock nuts provide substantial improvements over the 'Std. S" nuts in clamp force for a given tightening torque and in yield torque and yield clamp force, the "New S" lock nuts show marked improvements over the "Old S" lock nuts in these same respects. Thus, the new nuts show almost double the clamp force of the "Old S" nuts for the same tightening torque, a phenomenon which is especially surprising considering that the prevailing torque values for the "Old S" nuts are lower on an average than those for the new nuts. It is also highly significant that the yield torque for the new nuts is only 70% of the yield for the "Old S" nuts, as shown. Another unexpected effect of the new nuts is that despite their substantially lower yield torque they produce about 22% more yield clamp force than do the "Old S" nuts.

The reasons for the greatly improved performance of the new nut as compared to the "Old S" nut lie primarily in the provision of cone 11 occupying at least about the upper third of the nut height above the lowest extent of the indentations 16, and in the fact that distortion of the nut over its substantial height represented by the cone is effected indirectly by compression across opposing flats below, as shown by indents 16. Whereas in the "Old S" nut the distorted portion provides essentially a constant spring rate throughout its height, the new nut provides a variable spring rate over that substantial part of its distorted portion which is represented by cone 11. The cone allows the nut to be distorted a greater amount and yet adjust itself properly on the bolt despite the tolerances or variations in the threads. The greater clamp force of the new nuts, with the same tightening torque as with the "Old S" nuts, is attributable partly to the extreme pressure lubricant and partly to the resiliency provided by the cone 11. The higher yield clamp force of the new nut is due largely to the amount of distortion, which tilts downwardly the upper threads (at their portions adjacent the minor axis 18) and distributes the clamp load uniformly over the mating threads of the nut and bolt.

The cone 11 is essential also because otherwise, with this greater amount of distortion, the uniformly stiff spring action would cause galling of the threads when the nut is tightened on the bolt.

I claim:
1. A lock nut of the prevailing torque-type comprising a nut body of resilient material having a hexagonal shape to provide said body with six sides forming three pairs of opposed vertical flats, said nut body having a central vertical axis and including an integral upper portion forming an out-of-round truncated cone tapering continuously upwardly from said flats at an angle of approximately 45° relative to said axis, said body having a threaded central hole extending axially through the body from top to bottom and adapted to receive a mating bolt, said hole being circular at the bottom and partly defining at the reduced upper end of the cone an out-round annular surface in a plane normal to said axis, said annular surface forming the top of the nut body and being of substantially uniform dimension as measured between the inner and outer edges of the annular surface, said body having at the bottom an annular bearing face surrounding the hole in a plane normal to the nut axis, the height of the nut body as measured between the plane of said upper end of the the cone and said bearing face being at least about 0.90D minus 0.015 inch for nut sizes from ¼" through ⅝" diameter and at least 0.88D minus 0.020 inch for nut sizes from ¾" to 1½" diameter, where D is the nominal diameter of said mating bolt in inches, the opposed vertical flats of one of said pairs each having an indentation extending continuously across the upper portion of the flat, the lowest extent of said indentation being spaced below the plane of said upper end of the cone a distance equal approximately to one-third of said height of the nut body, said cone and the threaded hole portion within the cone having in cross-section and at the top the shape of an ellipse with its major axis parallel to said indented flats and disposed in a vertical plane intersecting a pair of opposed vertical corners formed by the other flats, the minor axis of said ellipse being perpendicular to said major axis, said cone and the nut body between said indentations defining a threaded hole which is out-of-round by an amount sufficient to provide the nut with a friction locking torque of $115D^{2.4}$ to $280D^{2.5}$, on a mating screw within the dimensional tolerances of its class of fit, the conical surface of said cone extending from said reduced upper end to said vertical flats, the minimum height of the cone, as measured from the plane of its upper end to the highest points of the flats, being at least one-third of said spacing of said lowest extent of said indentation and a coating of extreme pressure lubricant on the threads of said hole and said bearing face.

2. A lock nut according to claim 1, in which said annular bearing face at the bottom is in the form of an annular washer face having a diameter substantially equal to said width across flats at the bottom.

References Cited by the Examiner

UNITED STATES PATENTS

| 2,464,729 | 3/49 | Stover. |
| 2,586,786 | 2/52 | Cole. |
| 2,700,623 | 1/55 | Hall. |
| 2,940,495 | 6/60 | Wing. |
| 3,034,611 | 5/62 | Zenzic. |

FOREIGN PATENTS

| 164,195 | 7/55 | Australia. |

EDWARD C. ALLEN, *Primary Examiner.*

M. HENSON WOOD, Jr., *Examiner.*